US012759700B2

(12) United States Patent
Smeenk

(10) Patent No.: US 12,759,700 B2
(45) Date of Patent: Oct. 13, 2026

(54) FIXED-WING AIRCRAFT

(71) Applicant: DeltaQuad B.V., Duivendrecht (NL)

(72) Inventor: Coenraad Louis Smeenk, Badhoevedorp (NL)

(73) Assignee: DeltaQuad B.V., Duivendrecht (NL)

( * ) Notice: Subject to any disclaimer, the term of this patent is extended or adjusted under 35 U.S.C. 154(b) by 0 days.

(21) Appl. No.: 18/719,487

(22) PCT Filed: Dec. 6, 2022

(86) PCT No.: PCT/NL2022/050703
§ 371 (c)(1),
(2) Date: Jun. 13, 2024

(87) PCT Pub. No.: WO2023/121436
PCT Pub. Date: Jun. 29, 2023

(65) Prior Publication Data

US 2025/0042542 A1 Feb. 6, 2025

(30) Foreign Application Priority Data

Dec. 23, 2021 (NL) ...................................... 2030268

(51) Int. Cl.

*B64C 29/00* (2006.01)
*B64U 10/20* (2023.01)
*B64U 10/25* (2023.01)

(52) U.S. Cl.

CPC .......... *B64C 29/0008* (2013.01); *B64U 10/20* (2023.01); *B64U 10/25* (2023.01)

(58) Field of Classification Search

CPC ... B64C 29/0008; B64C 3/16; B64C 29/0016; B64C 39/10; B64C 23/076; B64U 10/20; B64U 10/25; B64U 30/20; B64U 50/13; B64U 50/19; B64U 30/10; Y02T 50/10
See application file for complete search history.

(56) References Cited

U.S. PATENT DOCUMENTS 4,116,405 A * 9/1978 Bacchi .................... B64C 39/12
D12/330
5,435,504 A * 7/1995 Inoue ...................... B64C 1/061
244/119
5,542,625 A * 8/1996 Burhans, Jr .............. B64C 3/16
244/45 R (Continued)

FOREIGN PATENT DOCUMENTS

EP 1645506 4/2006

*Primary Examiner* — Medhat Badawi
(74) *Attorney, Agent, or Firm* — MH2 Technology Law Group LLP

(57) ABSTRACT

Vertical take-off and landing (VTOL) aircraft of the fixed-wing type, comprising a centre section defining a centreline of the aircraft, and a pair of wings, arranged on either side of the centre section, wherein the wings extend longitudinally from the centre section away from and mutually symmetrical with respect to a plane of symmetry extending through the centreline, wherein each wing comprises a main wing section extending longitudinally from the centre section, wherein the main wing section is configured for generating lift in an upward direction, a wingtip section extending longitudinally from the main wing section in a downwards sloping manner with respect to the main wing section, and a control surface provided in the wingtip section.

11 Claims, 5 Drawing Sheets

(56) References Cited

U.S. PATENT DOCUMENTS

Figure 1:
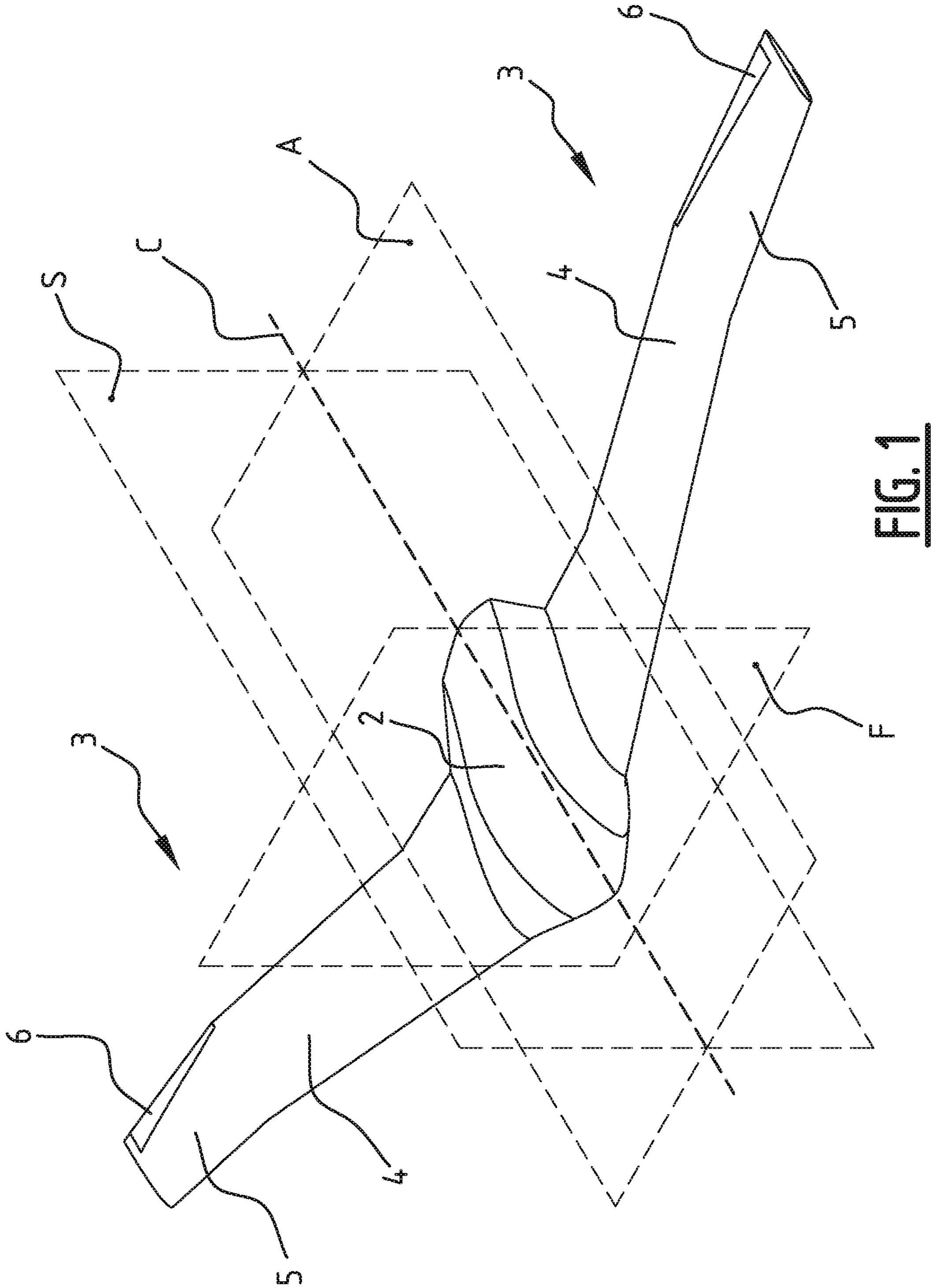

| | | | | |
|---|---|---|---|---|
| 5,634,613 | A * | 6/1997 | McCarthy | B64C 23/069 244/46 |
| 5,839,691 | A * | 11/1998 | Lariviere | B64C 27/605 244/17.23 |
| 5,941,478 | A * | 8/1999 | Schmittle | B64C 29/0033 244/131 |
| 8,376,266 | B2 * | 2/2013 | Gemmati | B64C 27/22 244/175 |
| 8,678,324 | B2 * | 3/2014 | Hemmelgarn | F03D 1/0675 416/240 |
| 8,936,219 | B2 * | 1/2015 | Roman | B64C 5/08 244/45 R |
| 9,751,614 | B1 * | 9/2017 | Nguyen | B64D 27/18 |
| 10,005,541 | B2 * | 6/2018 | Karem | H02S 20/30 |
| 10,118,696 | B1 * | 11/2018 | Hoffberg | B64C 21/00 |
| 10,308,346 | B2 * | 6/2019 | Parks | B64D 27/353 |
| 11,180,253 | B1 * | 11/2021 | Seeley | B64U 60/50 |
| 11,198,519 | B1 * | 12/2021 | Seeley | B64C 3/14 |
| D1,009,696 | S * | 1/2024 | Tao | D12/326 |
| 12,054,257 | B2 * | 8/2024 | Calatayud | B64C 3/38 |
| 12,139,251 | B2 * | 11/2024 | Donaldson | B64C 27/26 |
| 2003/0141409 | A1 * | 7/2003 | Lisoski | B64U 50/13 244/13 |
| 2010/0065677 | A1 * | 3/2010 | Ferrier | B64C 27/26 244/6 |
| 2011/0036939 | A1 * | 2/2011 | Easter | B64C 37/00 244/46 |
| 2011/0042524 | A1 * | 2/2011 | Hemmelgarn | B64C 3/48 244/203 |
| 2011/0084174 | A1 * | 4/2011 | Hemmelgarn | F03D 1/0675 416/241 R |
| 2014/0021302 | A1 * | 1/2014 | Gionta | B64C 21/10 244/200.1 |
| 2014/0231593 | A1 * | 8/2014 | Karem | B64C 1/0009 244/45 R |
| 2014/0319267 | A1 * | 10/2014 | Paranjape | B64C 3/42 244/47 |
| 2015/0225079 | A1 * | 8/2015 | Starck | B64U 10/20 244/12.5 |
| 2016/0207625 | A1 * | 7/2016 | Judas | B64C 29/0025 |
| 2016/0311545 | A1 * | 10/2016 | Parks | B64D 27/353 |
| 2016/0368590 | A1 * | 12/2016 | Karem | B64F 5/10 |
| 2018/0346118 | A1 * | 12/2018 | Frolov | F03D 5/00 |
| 2018/0362190 | A1 * | 12/2018 | Chambers | B64F 5/60 |
| 2019/0077496 | A1 * | 3/2019 | Livieratos | B64C 39/10 |
| 2019/0135424 | A1 * | 5/2019 | Baity | B64C 29/0033 |
| 2019/0263513 | A1 * | 8/2019 | Randall | B64C 27/22 |
| 2021/0031911 | A1 * | 2/2021 | Sinha | B64C 29/0033 |
| 2021/0147071 | A1 * | 5/2021 | Sola | B64C 23/072 |
| 2021/0221495 | A1 * | 7/2021 | Petscher | B64C 5/08 |
| 2021/0261240 | A1 * | 8/2021 | Donaldson | B64C 21/10 |
| 2022/0169400 | A1 * | 6/2022 | Seeley | B64C 1/20 |
| 2022/0355932 | A1 * | 11/2022 | Abramov | B64U 30/10 |
| 2022/0388649 | A1 * | 12/2022 | Bower | B64C 39/10 |
| 2024/0158071 | A1 * | 5/2024 | Wilson | B64C 3/56 |
| 2024/0294256 | A1 * | 9/2024 | Mikic | B64C 39/10 |
| 2025/0010988 | A1 * | 1/2025 | Pushp | B64U 10/25 |
| 2025/0011013 | A1 * | 1/2025 | Elson | B64C 17/02 |
| 2025/0042542 | A1 * | 2/2025 | Smeenk | B64C 3/16 |

* cited by examiner

FIXED-WING AIRCRAFT

The present invention relates to an aircraft of the fixed-wing type, in particular a vertical take-off and landing (VTOL) aircraft.

To fly, a fixed-wing aircraft has wings shaped to generate lift resulting from airspeed of the aircraft. A known example of such an aircraft is a VTOL unmanned aerial vehicle of the (tailless) flying-wing type. Each wing thereof comprises a main wing section for generating upward lift, extending longitudinally from a centre section, wherein a control surface is provided in the main wing section. Such unmanned aerial vehicles are increasingly deployed for non-military purposes, such as aerial inspection, mapping, surveying, surveillance and transportation.

Continuous research and development of such aircraft are aimed at reducing manufacturing costs and increasing manoeuvrability, reliability, payload capacity, aircraft speed and flight range. An often-encountered issue is adverse yaw. Adverse yaw is a tendency for an aircraft to yaw (i.e., rotate around the yaw axis of the aircraft) in the opposite direction of a turn resulting from a roll (i.e., a rotation around the roll axis of the aircraft), due to a mutual lift and drag differential of the wings. Such a roll may be achieved e.g. by a deflection of the control surface as a result of a roll command. Although adverse yaw may be reduced with additional yaw control such as designated ailerons and/or a vertical tail, or rudder, such measures may reduce aerodynamic efficiency.

It is therefore an object of the present invention, amongst other objects, to improve the agility of the aircraft.

Thereto, an aircraft of the fixed-wing type according to appended claim 1, in particular a VTOL aircraft, is provided, comprising a centre section defining a centreline of the aircraft, and a pair of wings, arranged on either side of the centre section, wherein the wings extend longitudinally from the centre section away from and mutually symmetrical with respect to a plane of symmetry extending through the centreline.

In other words, longitudinal axes of the wings extend in respective directions radially away from the centreline axis. The plane of symmetry between the wings may also be referred to as a lateral plane. Preferably, the lateral plane is defined by the roll axis and the yaw axis of the aircraft. A direction, perpendicular to the lateral plane, and the centreline define an axial plane. Additionally, or alternatively, the axial plane may be horizontal. Preferably, the axial plane is defined by the roll axis and the pitch axis (i.e., the axis perpendicular to the roll and yaw axes) of the aircraft. A plane perpendicular to both the axial and the lateral plane is referred to as a frontal plane, preferably defined by the yaw axis and the pitch axis of the aircraft.

More specifically, each wing comprises a main wing section extending longitudinally from the centre section, wherein the main wing section is configured for generating lift in an upward direction, a wingtip section extending longitudinally from the main wing section, preferably in a downwards sloping manner with respect to the main wing section, and a control surface. The control surface, such as an aileron and/or a spoiler, is preferably provided in the wingtip section. The aileron may be for instance an elevon, such as a taileron. The control surface may be for instance a morphing wing surface. As such, various control surfaces can be envisaged.

Upwards and downwards can be defined as traverse to the axial plane or, more specifically, mutually opposite and perpendicular to the axial plane. A downward slope of a wing is hereinafter also referred to as anhedral, which is a downward angle of the wing with respect to horizontal, or the axial plane, as seen in the frontal plane. The term “dihedral” hereinafter refers to an upward angle from horizontal, or the axial plane. Anhedral may thus alternatively be referred to as negative dihedral.

The wingtip section slopes downwards with respect to the main wing section, such that the wingtip section and the main wing section are mutually arranged at an obtuse angle as seen in the frontal plane. The wing may thus be curved or angled. In other words, a longitudinal axis of the wingtip section is arranged at a downward angle deviating further downwards from horizontal than a longitudinal axis of the main wing section. This can be described as tip anhedral. The main wing section is then provided with dihedral or less anhedral than the wingtip section. Preferably, the main wing sections are arranged substantially in the same plane, for instance in the axial plane or substantially parallel thereto.

From an end of the main wing section, distal to the centreline, the downwards sloping wingtip section thus extends away from the lateral plane in a direction having a downward component, as seen in the frontal plane.

By providing the wingtip sections with anhedral and providing the control surfaces in the respective wingtip sections, a deflection of one or more of the control surfaces can result in yaw control. It has been found that this combination can improve the yaw control and/or speed, and therefore the manoeuvrability and agility of the aircraft. The more anhedral, the more the control surface controls yaw instead of roll. Preferably, each wingtip section slopes downward from the respective main wing section at an anhedral angle of more than 0 degrees and up to 45 degrees, preferably in a range from 5 to 20 degrees, in particular as seen in the frontal plane. The anhedral angle may be a downward angle with respect to horizontal, the axial plane or the longitudinal axis of the main wing section.

Preferably, each wingtip section comprises between 20 and 50 percent of the length of the respective wing.

According to an embodiment of the aircraft, each wingtip section is provided with a wash-out twist relative to the respective main wing section. The wash-out twist relates to the angle of incidence, which is an angle between a chord line of a wing and the centreline, as seen in the lateral plane. A wash-out twist is herein defined as a reduction of the angle of incidence along the longitudinal axis of the wing from the root of the wing to the tip thereof. In other words, the wingtip section is provided with a lower angle of incidence in comparison with the main wing section. The opposite, wherein the angle of incidence increases, is referred to as wash-in. As the control surface is preferably provided in the wing tip section, the wash-out twist of the wing tip section with respect to the main wing section ensures that the main wing section stalls before the wing tip section, such that the aircraft remains controllable by means of said control surface. Preferably, the wash-out twist is provided relative to an aerofoil of the main wing section furthest from the centreline, i.e., the distal end of the main wing section, distal to the centreline and the centre section. In other words, the wing tip section is preferably provided with a wash-out twist relative to the adjacent aerofoil of the main wing section.

Preferably, the wash-out twist has a twist angle in a range from 2 to 15 degrees, preferably from 3 to 12 degrees. That is, the angle of incidence of the wingtip section is preferably between 2 and 15 degrees, more preferably between 3 and 12 degrees, lower than the angle of incidence of the main wing section.

Particularly the combination of the aforesaid tip anhedral and the wash-out twist as described herein has been found to improve the yaw and/or roll control of the aircraft to an unforeseen extent. By combining tip anhedral with wash-out, the respective advantages thereof can be obtained with relatively small angles of anhedral and twist, while any disadvantages associated with the respective measures can be reduced or minimised. For example, a tip anhedral angle that is too large may result in the problem of having a small clearance with respect to the ground, for instance during landing. To illustrate, some known wings with wash-out (and without tip anhedral) have twist angles well in excess of 15 degrees to obtain the intended effect. Wings of other known aircraft have less than 2 degrees of twist (and no tip anhedral) since, in such aircraft, the disadvantages of an increased twist do not outweigh the advantages. To illustrate further, the known VTOL unmanned aerial vehicle of the example described in the introduction (without wash-out twist) is provided with tip dihedral of nearly 90 degrees.

Providing a wingtip section with a control surface and a wash-out twist can reduce adverse yaw. The further addition of tip anhedral can further improve yaw control such that, for every degree of tip anhedral (i.e. already with small angles of tip anhedral), the effect of the control surface on yaw control increases. This way, "proverse" yaw can be provided, which is the tendency for an aircraft to yaw in the same direction of a turn resulting from a roll, as opposed to the opposite direction in the case of adverse yaw. Such proverse yaw can further improve the agility of the aircraft by enhancing the ability of the aircraft to make quick turns.

Particularly in case the aircraft is to house a relatively large payload compartment, the centre section may be particularly thick relative to the wings. For instance, the thickness-to-chord ratio of the centre section may be over 25 percent. To maintain an attached airflow over the centre section in-flight at high angles of attack, the centre section may be provided with a longer chord line, which would significantly affect the lift distribution across the aircraft. Instead, or in addition thereto, to optimise the lift distribution, the centre section is tilted with respect to the main wing sections as seen in the lateral plane such that the centre section has a smaller angle of attack than the main wing section in-flight. Therefore, according to a further embodiment of the aircraft, each main wing section is preferably arranged with respect to the centre section (e.g., mounted to the centre section) at an angle of incidence in a range from more than 0 up to 10 degrees, preferably from 2 to 8 degrees. This way, the centre section can be pitched downwards such that the lift of the centre section is reduced to be in proportion with adjacent aerofoils, such as aerofoils of the main wing sections. For example, the lift of the centre section may be only 10 percent, or less, higher than the lift of an adjacent aerofoil.

With the lift of the centre section being in proportion, the lift distribution and therewith the flight efficiency, such as drag, can be optimised. Furthermore, reducing the angle of the centre section (i.e., increasing the angle of incidence of the main wing section) can prevent that the angle of attack of the centre section reaches high values that, for instance, exceed 10 degrees. This way, a loss of performance and pitch stability can be prevented, since such high angles increase the chance that flow separates from the upper surface of the centre section. A reduced angle of the centre section thus allows the centre section to have a short chord relative to its thickness, thereby reducing material use and mass.

According to a further embodiment, the aircraft is an aircraft of the flying-wing type. In that case, the centre section, the main wing sections, and the wingtip sections are blended together to form the pair of wings. It is herein to be appreciated that a flying wing, alternatively known as an all-wing type aircraft, may be for instance a tailless blended wing-body, a flying wing with a deep centre chord, or any tailless aircraft in general.

According to a further embodiment, the aircraft is an unmanned aerial vehicle.

Generally, tip anhedral may reduce the clearance with respect to the ground during landing and/or take-off, such that an aircraft would require taller landing gear, especially in case of horizontal take-off and/or landing, during which the aircraft commonly pitches upwards and, consequently, the wing tip nears the ground. Therefore, although the aircraft may be any type of fixed-wing aircraft, the aircraft is preferably a VTOL aircraft. A VTOL aircraft is capable of landing and/or taking off vertically, which herein includes for instance short take-off and (vertical) landing. As such, the height of the landing gear can be reduced, thereby saving material and thus weight, so as to further improve flight range of the aircraft. To that end, the VTOL aircraft preferably comprises at least one propulsion device configured for providing thrust for lifting and/or propelling the aircraft. The propulsion device is for instance a rotor. The aircraft preferably comprises four propulsion devices configured for lifting the aircraft and arranged, equidistantly, on either side of the centre section and on either side of each wing (e.g., one proximate to the leading edge of the wing and one proximate to the trailing edge of the wing). Preferably, the propulsion device is a propeller (airscrew) with a propeller shaft, substantially coaxial with a rotation axis of the propeller. The propeller shaft is preferably driven by an electric motor. Preferably, the electric motor drives the propeller shaft directly. The aircraft preferably comprises a fifth propulsion device, preferably a propeller, for propelling the aircraft in-flight, preferably in a propulsion direction parallel to the centreline or the chord line of the main wing section, or parallel to a direction therebetween. The propulsion device is preferably arranged in the lateral plane.

As such, according to a second aspect of the invention, a fixed-wing aircraft is provided, comprising a centre section defining a centreline of the aircraft, and a pair of wings, arranged on either side of the centre section, wherein the wings extend longitudinally from the centre section away from and mutually symmetrical with respect to a plane of symmetry extending through the centreline. Each wing comprises a main wing section extending longitudinally from the centre section, wherein the main wing section is configured for generating lift in an upward direction, a wingtip section extending longitudinally from the main wing section, preferably in a downwards sloping manner with respect to the main wing section, and a control surface, preferably provided in the wingtip section. Each wingtip section is preferably provided with a wash-out twist relative to the respective main wing section.

As indicated above, the aircraft may be any type of fixed-wing aircraft which, e.g., may or may not be a VTOL aircraft and/or which may be a fixed-wing aircraft of the flying-wing type. According to a third aspect of the invention, a fixed-wing aircraft of the flying-wing type is provided, comprising a centre section defining a centreline of the aircraft, and a pair of wings, arranged on either side of the centre section, wherein the wings extend longitudinally from the centre section away from and mutually symmetrical with respect to a plane of symmetry extending through the centreline. Each wing comprises a main wing section extending longitudinally from the centre section, wherein the main wing section is configured for generating lift in an upward direction, a wingtip section extending longitudinally from the main wing section, preferably in a downwards sloping manner with respect to the main wing section, and a control surface, preferably provided in the wingtip section.

Figures 2A, 2B, 2C:
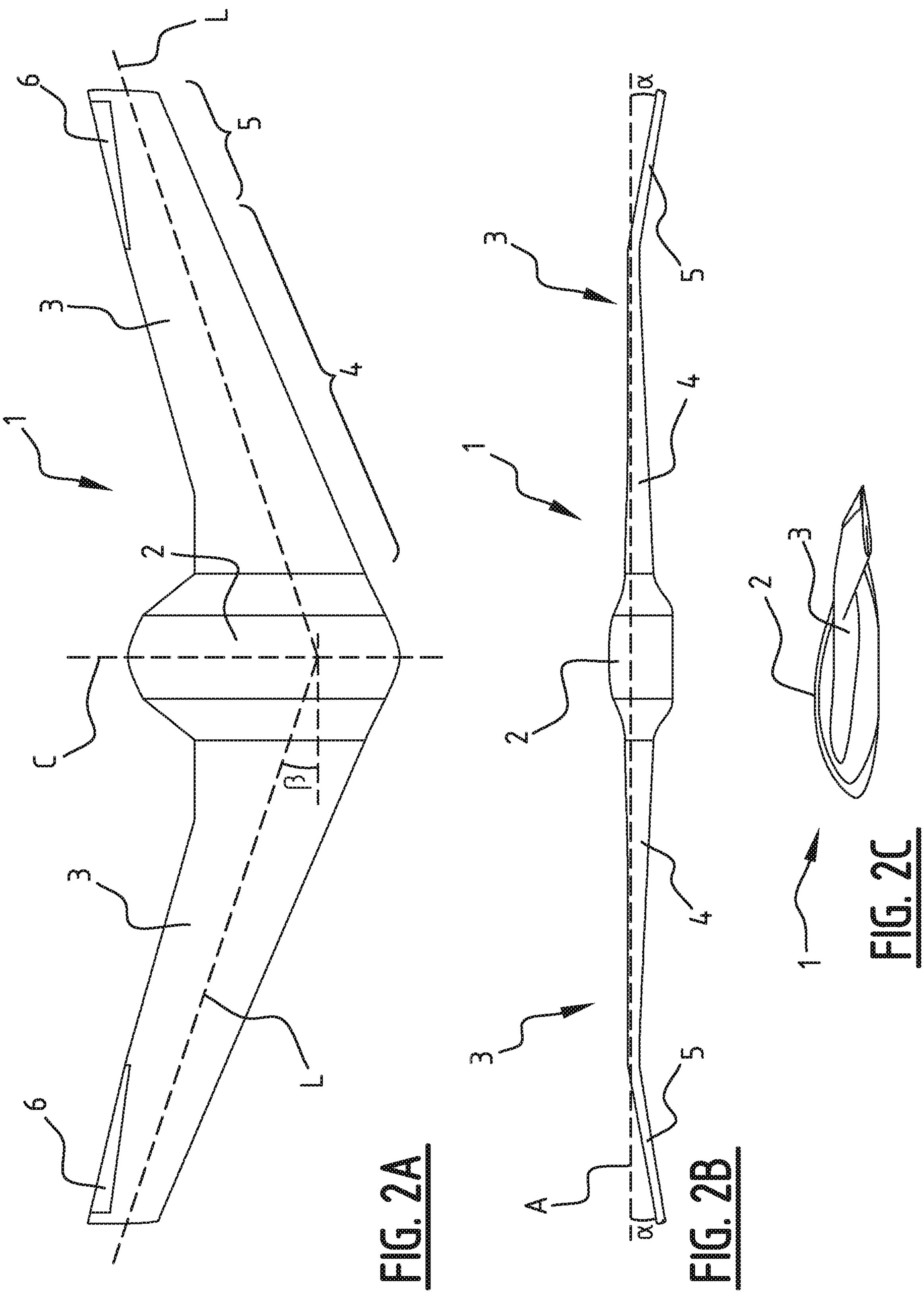
Figure 3:
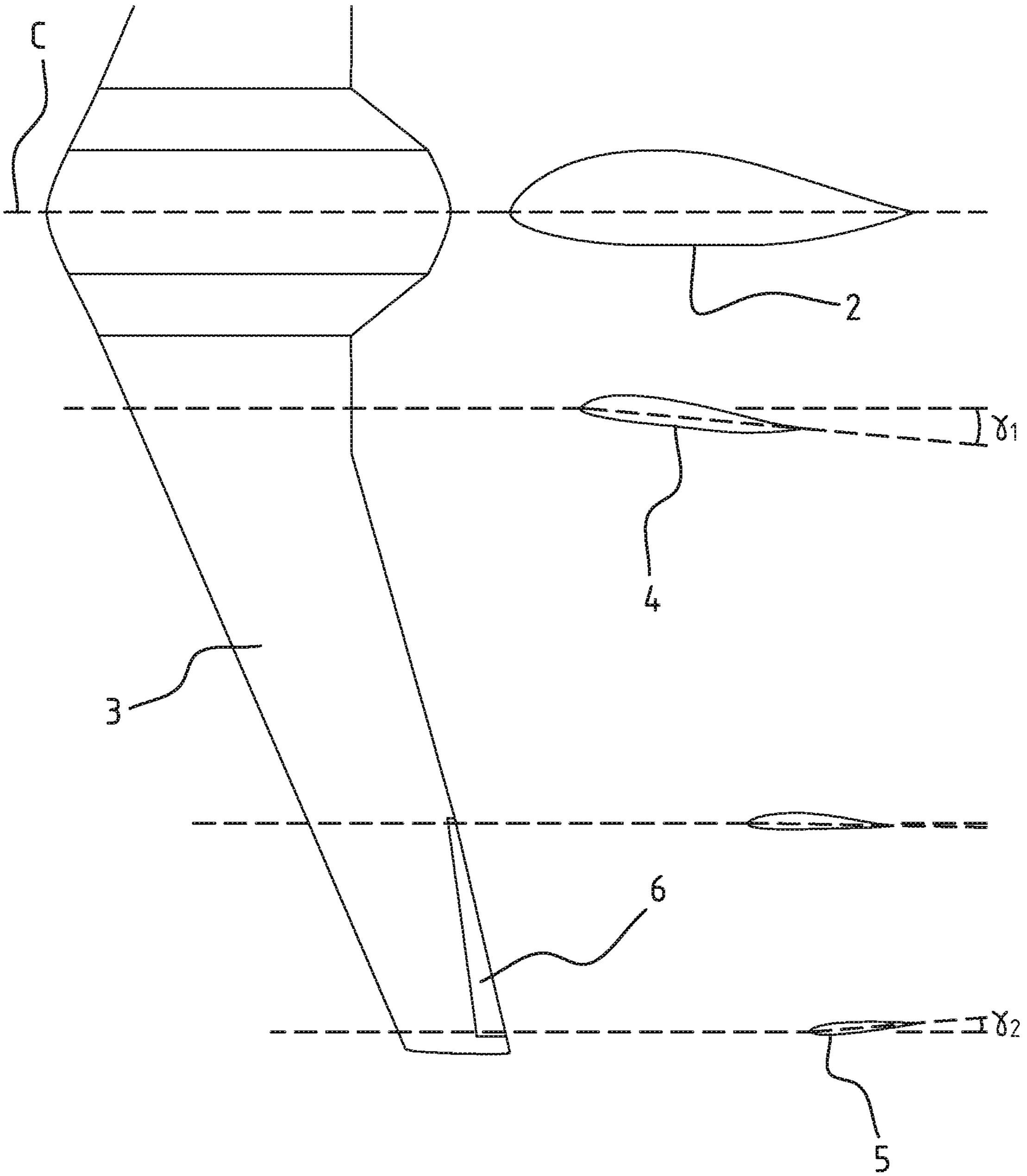
Figure 4:
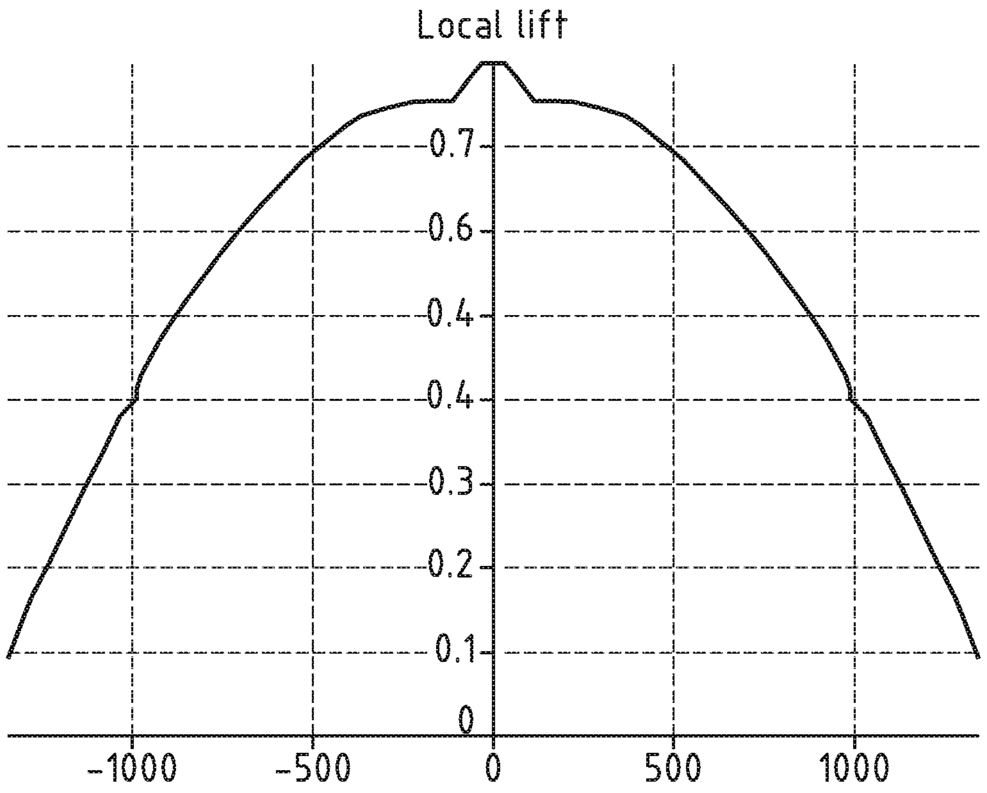
Figure 5:
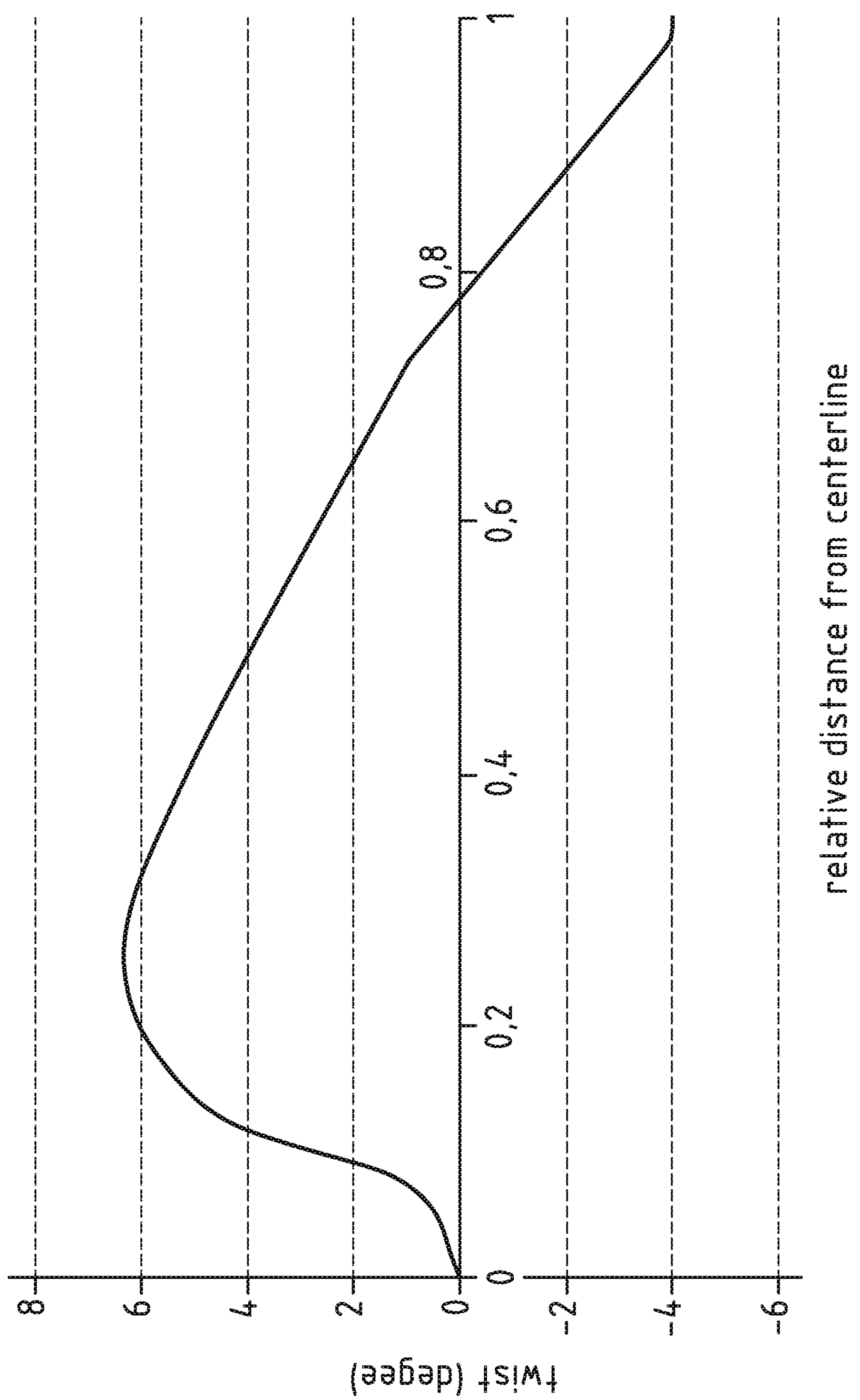

The invention is further elucidated hereinafter on the basis of the attached drawings, wherein:

FIG. 1 depicts an isometric view of the aircraft;

FIGS. 2A-C depict respectively top, frontal and lateral views of the aircraft;

FIG. 3 depicts various cross-sections along a wing, as seen in the lateral plane;

FIG. 4 graphically depicts the lift across the aircraft at 10 degrees angle of attack; and FIG. 5 graphically depicts the spanwise pitch distribution.

In FIG. 1, a VTOL unmanned aerial vehicle 1 of the all-wing type is shown. The vehicle 1 comprises a centre section 2 defining a centreline C, and a pair of wings 3 arranged on either side of the centre section 2. The wings 3 extend longitudinally from the centre section 2 and mutually symmetrical with respect to the centreline C.

As such, the wings 3 define a plane of symmetry S, or lateral plane. Horizontal and perpendicular to the lateral plane S is an axial plane A. A frontal plane F is perpendicular to both the axial plane A and the lateral plane S.

As indicated in FIG. 2A, a respective longitudinal axis L of each wing 3 extends in a respective direction radially away from the centreline axis C at a sweep angle β, which is an angle between the frontal plane F and the wing axis L. Each wing 3 comprises a main wing section 4, extending longitudinally from the centre section 2, and a wingtip section 5 extending longitudinally from the main wing section 4. A control surface 6 is provided in the wingtip section 5.

For landing and taking off vertically, the aerial vehicle 1 comprises four rotors (not shown) arranged, equidistantly, on either side of the centre section 2 and on either side of each wing 3, in particular the longitudinal axis L thereof (e.g., one at the leading edge of the wing 3, and one at the trailing edge of the wing 3). The vehicle 1 comprises a fifth rotor (also not shown) for propelling the vehicle 1 in-flight.

With reference to FIG. 2B, it can be seen that the wing 3, specifically the wingtip section 5, is angled in a downwards sloping manner. The anhedral angle α of the tip 5 with respect to the axial plane A, as seen in the frontal plane F, corresponds to the downward slope and equals approximately 6 degrees. Furthermore, the main wing sections 4 are arranged substantially in the horizontal axial plane A. The wingtip section 5 comprises approximately a third of the length of the respective wing 3.

As shown in FIGS. 2B and 2C, the centre section 2 is substantially thicker than the wings 3 to be able to house a payload compartment. To optimise the lift distribution in-flight as described above, the centre section 2 is pitched downwards with respect to the axial plane A as seen in the lateral plane S. As such, each main wing section 4 is mounted to the centre section at 5 degrees angle of incidence $\theta_1$ relative to the centreline C, as illustrated in FIG. 3. The wingtip section 5 is provided with a reduced angle of incidence $\theta_2$ with respect to the main wing section 4. In the spanwise lift distribution graph, FIG. 4, the lift of each aerofoil is plotted against the distance of the respective aerofoil with respect to the centreline C or lateral plane S. The lift of the centre section 2 (as indicated on the horizontal axis up to 100 millimetres away from the centreline C or lateral plane S) is shown to be in proportion with the lift of adjacent aerofoils of the main wing sections 4 (approximately 200 millimetres away from the centreline C or lateral plane S) at 10 degrees angle of attack.

Each wing 3 is provided with a wash-out twist, which is a reduction of the angle of incidence θ along the longitudinal axis L of the wing 3 from the root of the wing 3 to the tip thereof. To illustrate, an example of a design parameter for the vehicle 1, the wing twist distribution, is provided, in which the aerofoils at varying distances from the centreline are twisted with respect to each other. In FIG. 5, a twist angle of each aerofoil is plotted against the distance of the respective aerofoil with respect to the centreline C or lateral plane S. The distance is relative to the half wingspan of the vehicle 1 (i.e., a relative distance of 1 represents the distance from the centreline to the wingtip). The wingtip section 5 is provided with an angle of incidence $\theta_2$ that gradually lowers from 1 to −4 degrees relative to the root of the wing 3, as represented graphically in FIG. 5 (as indicated on the horizontal axis from 70 to 100 percent of the half wingspan away from the centreline C or lateral plane S).

The embodiments illustrated in the figures and described above are not intended to limit the scope of the appended claims in any way and are to be construed as illustrative examples.

The invention claimed is:

1. A vertical take-off and landing (VTOL) aircraft, comprising a centre section defining a centreline of the aircraft, and a pair of wings, arranged on either side of the centre section, wherein the wings extend longitudinally from the centre section away from and mutually symmetrical with respect to a plane of symmetry extending through the centreline, wherein each wing comprises: a main wing section, extending longitudinally from the centre section, wherein the main wing section is configured for generating lift in an upward direction; a wingtip section, extending longitudinally from the main wing section in a downwards sloping direction with respect to the main wing section; and a control surface, provided in the wingtip section, wherein the aircraft is a fixed-wing aircraft of a flying-wing, wherein the centre section is thicker than the wings and houses a payload compartment, wherein each main wing section is mounted to the centre section at an angle of incidence in a range from 2 to 10 degrees such that the centre section is pitched downwards in-flight to reduce an angle of attack of the centre section such that an airflow over the centre section remains attached, preventing a loss of performance and pitch stability as a result of the centre section thicker than the wings, wherein each wingtip section slopes downward from the respective main wing section at an anhedral angle of more than 0 degrees and up to 45 degrees, wherein each wingtip section is provided with a wash-out twist relative to the respective main wing section, and wherein the wash-out twist has a twist angle in a range from 2 to 15 degrees.

2. The VTOL aircraft according to claim 1, wherein the aircraft comprises at least one propulsion device configured for providing thrust for lifting and/or propelling the aircraft.

3. The VTOL aircraft according to claim 1, wherein the main wing sections are arranged substantially in the same plane.

4. The VTOL aircraft according to claim 1, wherein each wingtip section slopes downward from the respective main wing section at an anhedral angle in a range from 5 to 20 degrees.

5. The VTOL aircraft according to claim 1, wherein the aircraft is an unmanned aerial vehicle.

6. The VTOL aircraft according to claim 1, wherein each main wing section is arranged with respect to the centre section at an angle of incidence in a range from 2 to 8 degrees.

7. The VTOL aircraft according to claim 1, wherein each wingtip section comprises between 20 and 50 percent of the length of the respective wing.

8. The VTOL aircraft according to claim 1, wherein the control surface is at least one of an aileron and a spoiler.

9. The VTOL aircraft according to claim 1, wherein the wash-out twist has a twist angle in a range from 3 to 12 degrees.

10. A vertical take-off and landing (VTOL) aircraft, comprising a centre section defining a centreline of the aircraft, and a pair of wings, arranged on either side of the centre section, wherein the wings extend longitudinally from the centre section away from and mutually symmetrical with respect to a plane of symmetry extending through the centreline, wherein each wing comprises: a main wing section, extending longitudinally from the centre section, wherein the main wing section is configured for generating lift in an upward direction; a wingtip section, extending longitudinally from the main wing section in a downwards sloping direction with respect to the main wing section; and a control surface, provided in the wingtip section, wherein the aircraft is a fixed-wing aircraft of flying-wing, wherein the centre section is thicker than the wings and houses a payload compartment, wherein each main wing section is mounted to the centre section at an angle of incidence in a range from 2 to 10 degrees, wherein each wingtip section slopes downward from the respective main wing section at an anhedral angle of more than 0 degrees and up to 45 degrees, wherein each wingtip section is provided with a wash-out twist relative to an aerofoil of the respective main wing section, the aerofoil furthest from the centreline and adjacent to the wingtip section, and wherein the wash-out twist has a twist angle in a range from 2 to 15 degrees relative to the adjacent aerofoil of the main wing section.

11. The VTOL aircraft according to claim 1, wherein the thickness-to-chord ratio of the centre section is over 25 percent.

* * * * *